United States Patent

Oba et al.

[11] Patent Number: 4,767,693
[45] Date of Patent: Aug. 30, 1988

[54] OPTICAL INFORMATION RECORDING MEDIUM

[75] Inventors: Hideaki Oba; Yutaka Ueda; Tsutomu Sato; Masaakira Umehara; Michiharu Abe, all of Yokohama; Hitoshi Funakoshi; Seiko Kobayashi, both of Okayama, all of Japan

[73] Assignee: Ricoh Co., Ltd., Tokyo, Japan

[21] Appl. No.: 105,512

[22] Filed: Oct. 2, 1987

[30] Foreign Application Priority Data

Aug. 13, 1984 [JP] Japan ................... 59-167892
Nov. 2, 1984 [JP] Japan ................... 59-230300

[51] Int. Cl.$^4$ .............................................. G03C 1/00
[52] U.S. Cl. ...................................... 430/270; 430/271; 430/21; 430/945; 430/49 S
[58] Field of Search ............. 430/584, 588, 945, 21, 430/270, 271, 49 S; 346/125.1, 76 L

[56] References Cited

U.S. PATENT DOCUMENTS 3,761,942 9/1973 Lorenz et al. .................. 430/374
4,460,665 7/1984 Kunikane et al. .............. 430/945
4,583,102 4/1986 Tamura et al. ................. 430/945

FOREIGN PATENT DOCUMENTS

85/05078 11/1985 European Pat. Off. .
0174383 11/1985 European Pat. Off. .
59-67092 4/1984 Japan .

Primary Examiner—Won H. Louie
Attorney, Agent, or Firm—Flynn, Thiel, Boutell & Tanis

[57] ABSTRACT

This invention provides an optical information recording medium that has, on a substrate, a recording layer containing a cyanine dye represented by the general formula:

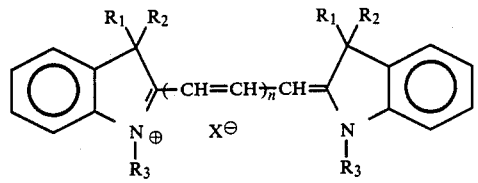

(wherein, $R_1$, $R_2$ and $R_3$ may be the same or different and each stands for a substituted or unsubstituted alkyl group; X stands for a perhalogenate ion, a toluenesulfonate ion or an alkylsulfate ion; n stands for an integrer of 0 or 1–3; a first halogen atom is present in at least one of each 4, 6 and 7-positions of the indole and indolenine rings; a second halogen atom may be present in each 5-position of said rings; and at lest one group consisting of alkyl, alkoxy, hydroxy, carboxy, allyl and alkylcarbonyl may be present in at least one of each 4, 5, 6 and 7-positions of said rings.) and, if necessary, a transition metal complex or a salt of said complex with a cation.

64 Claims, 2 Drawing Sheets

OPTICAL INFORMATION RECORDING MEDIUM

This application is a continuation of U.S. Ser. No. 762,975, filed Aug. 6, 1985 abandoned.

BACKGROUND OF THE INVENTION (a) Field of the Invention

The present invention relates to an optical information recording medium used suitably in recording and regenerating information with a laser beam, said medium being provided with a recording layer containing a cyanine dye in which a halogen atom is present in at least one of each 4, 6 and 7-positions of its indole and indolenine rings.

(b) Description of the Prior Art

A method of recording and regenerating information by radiating a laser beam on a rotating disk-shaped optical information recording medium has hitherto been known. As the optical information recording medium for use in this method there has been proposed the one which comprises providing, on a substrate, a thin layer of a low melting metal or a mixed thin layer of this metal and a dielectric substance.

However, the optical information recording medium of this sort is disadvantageous in respect of inferior preservability, low resolving power, low recording density, high production cost and the like. In view of this, it has recently been proposed to use an organic dye thin film, whose physical properties are changeable upon exposure to a relatively long wavelength light such as a semi-conductor laser beam, as a recording layer. However, the dye thin film having absorptivity on the long wavelength side involves the problems that it is generally inferior in stability against heat and light (inclusive of regenerating light after completion of recording) and the like. Accordingly, the fact is that a recording layer having satisfactory recording characteristics has not been developed yet.

SUMMARY OF THE INVENTION

The present invention has been accomplished in the light of the above mentioned existing state, and its object is to improve the stability of an optical recording material.

We have devoted ourselves to study in order to achieve the above mentioned object to find that a cyanine dye having the following general formula is usable as said stable recording material. The present invention has been completed on the basis of this finding.

That is, the object of the present invention is to provide an optical information recording medium that has a recording layer containing a dye represented by the following general formula [I]:

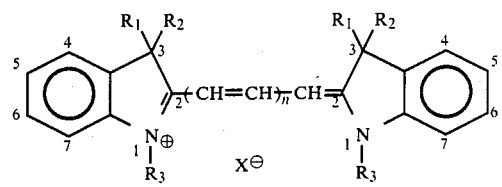

(wherein, $R_1$, $R_2$ and $R_3$ may be the same or different and each stands for a substituted or unsubstituted alkyl group; X stands for a perhalogenate ion, a toluenesulfonate ion or an alkylsulfate ion; n stands for an integer of 0 or 1–3; a first halogen atom is present in at least one of each 4, 6 and 7-positions of the indole and indolenine rings; a second halogen atom may be present in each 5-position of said rings; and at least one of the group consisting of alkyl, alkoxy, hydroxy, carboxy, allyl and alkylcarbonyl may be present in at least one of each 4, 5, 6 and 7-positions of said rings.)

Each of the alkyl group and the alkoxy group herein is preferred to have carbon atoms of 1–4. As concrete examples of the substituted alkyl groups represented by $R_1$, $R_2$ and $R_3$ there can be enumerated hydroxyalkyl, aminoalkyl, halogenoalkyl, allylalkyl, alkoxyalkyl and acyloxyalkyl. As the perhalogenate ion there is normally used a perchlorate ion $ClO_4^-$. It is preferred that, when the second halogen atom is present in said rings, the first halogen atom is present in each 7-position of said rings.

When the dye having the above general formula [I] is used in the recording layer, the thermal resistance of the recording medium is improved. This reason has not been elucidated satisfactorily yet, but it is considered to be caused by the influence of electron absorption effect by halogen atoms on the indole ring and the indolenine ring and the ionic radius size of the counter ion ($X^\theta$) The dye represented by the general formula [I] is thus characterized by the presence of at least one halogen atom on each specified position of the indole and indolenine rings. This compound is also characterized by the absence of halogen ion as the counter ion. The dye, in which the halogen ion exists as the counter ion, is not used suitably in the present invention. The reason is that as said dye is high in decomposition speed, when this dye is used in a recording medium, the thermal resistance of this medium is liable to deteriorate.

The concrete examples of dyes of the present invention represented by the aforesaid general formula will be enumerated as follows. However, the present invention should not be limited to these alone.

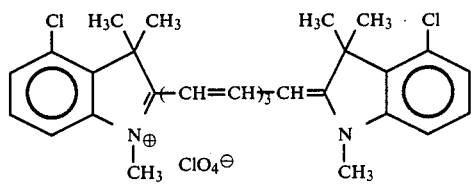

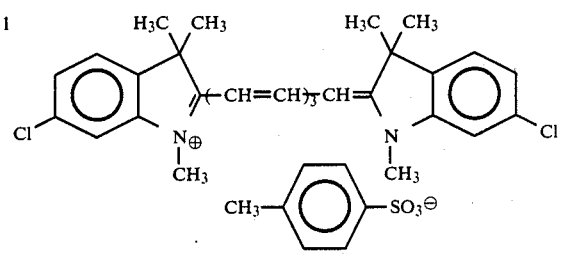

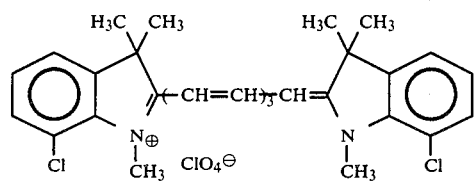 3

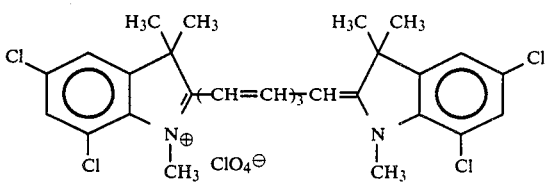 4

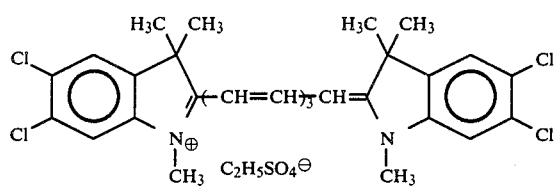 5

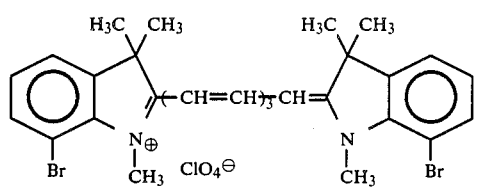 6

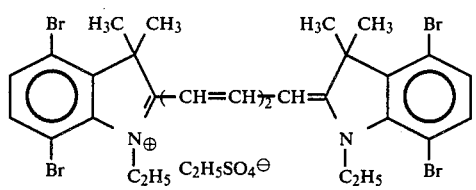 7

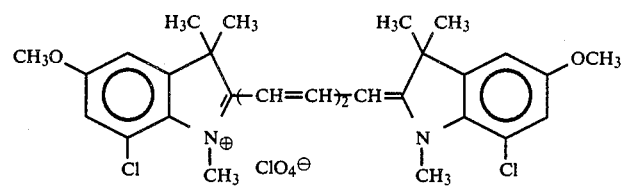 8

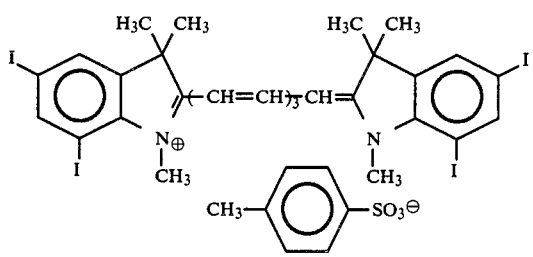 9

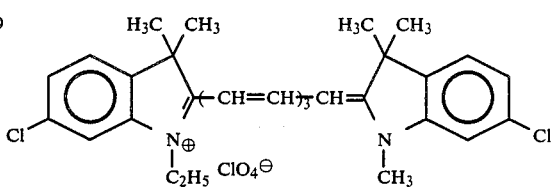 10

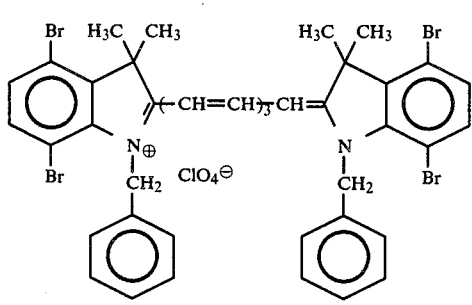 11

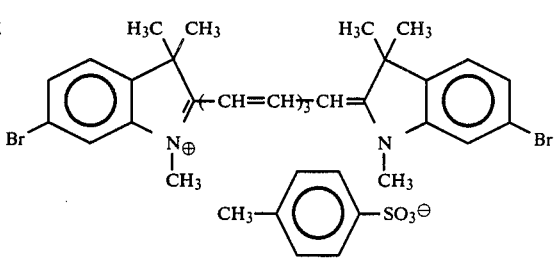 12

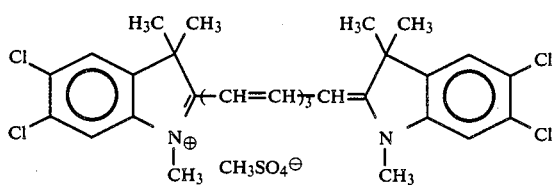 13

It is preferable to further add a transition metal complex or its cation salt (a salt of said complex with a cation) to the recording layer of the present invention for the purpose of improving its stability against heat and light.

The concrete examples of the transition metal complex or its cation salt to be used in combination with the dye of the general formula [1] in the present invention will be enumerated hereinafter. However, the present invention should not be limited thereto.

(1) acetylacetonatochelates (C-1)Ni(II)acrylacetonate
(C-2)Cu(II)acetylacetonate
(C-3)Mn(III)acetylacetonate
(C-4)Co(II)acetylacetonate

(2) bisdithio-α-diketones (C-5)bis(dithiobenzyl)nickel
(C-6)bis(dithiobiacetyl)nickel
(C-7)bis(4-diethylaminobenzyldithio)nickel
(C-8)bis(4-dimethylaminobenzyldithio)nickel

(3) bisphenyldithiols (C-9)bis(1,2-dithiophenyl)nickel
(C-10)bis(1,2-dithio-3,6-dimethylphenyl)nickel
(C-11)bis(1,2-dithio-3,4,6-trimethylphenyl)nickel
(C-12)bis(1,2-dithio-3,4,5-trimethylphenyl)nickel
(C-13)bis(1,2-dithio-3,4,5,6-tetramethylphenyl)nickel
(C-14)bis(1,2-dithio-3,4,5,6-tetrachlorophenyl)nickel
(C-15)bis(1,2-dithio-3,6-dichlorophenyl)nickel
(C-16)bis(1,2-dithio-[d]-benzophenyl)nickel
(C-17)bis(1,2-dithio-3,6-methyl-[d]benzophenyl)nickel
(C-18)bis(1,2-dithio-3-methylphenyl)nickel
(C-19)bis(1,2-dithio-3,4,5-trichlorophenyl)nickel
(C-20)bis(1,2-dithio-3,4,6-trichlorophenyl)nickel
(C-21)bis(1,2-dithiophenyl)cobalt
(C-22)bis(1,2-dithiophenyl)platinum
(C-23)bis(1,2-dithio-5-chlorophenyl)nickel
(C-24)bis(1,2-dithio-4-methylphenyl)nickel These metal complexes may form salts with cations. For instance, the following tetraammonium salts may be enumerated.

(C-25)bis(1,2-dithio-3-methylphenyl)nickel tetrabutylammonium
(C-26)bis(1,2-dithio-4-methylphenyl)nickel tetrabutylammonium
(C-27)bis(1,2-dithio-3-methylphenyl)nickel tetra(butyl)ammonium
(C-28)bis(1,2-dithio-4-methylphenyl)nickel tetra(butyl)ammonium
(C-29)bis(1,2-dithio-3,4,6-trimethylphenyl)nickel tetra(butyl)ammonium
(C-30)bis(1,2-dithio-3,4,5-trimethylphenyl)nickel tetra(butyl)ammonium
(C-31)bis(1,2-dithio-3,4,6-trimethylphenyl)nickel tetra(4-hydroxybutyl)ammonium
(C-32)bis(1,2-dithio-3,4,5-trimethylphenyl)nickel tetra(4-hydroxybutyl)ammonium
(C-33)bis(1,2-dithio-3,4,6-trichlorophenyl)nickel tetra(4-hydroxybutyl)ammonium
(C-34)bis(1,2-dithio-3,4,5-trichlorophenyl)nickel tetra(4-hydroxybutyl)ammonium
(C-35)bis(1,2-dithiophenyl)cobalt tetraprophy ammonium
(C-36)bis(1,2-dithiophenyl)platinum dipropyldibutyl ammonium
(C-37)bis(1,2-dithio-3,4,6-trichlorophenyl)nickel tetra(butyl)ammonium
(C-38)bis(1,2-dithio-3,4,5-trichlorophenyl)nickel tetra(butyl)ammonium

(4) salicylaldehyde oximes

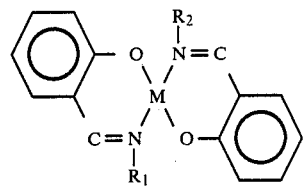

(wherein, $R_1$ and $R_2$ each stands for an alkyl group, and M stands for transition metal atoms such as Ni, Co, Cu, Pd, Pt and the like.)

(C-39)Ni(II)o-(N-isoprophylformimidoyl)phenol
(C-40)Ni(II)o-(N-dodecylformimidoyl)phenol
(C-41)Co(II)o-(N-dodecylformimidoyl)phenol
(C-42)Cu(II)o-(N-dodecylformimidoyl)phenol
(C-43)Ni(II)2,2'-[ethylene-bis(nitrilomethylidyne)] diphenol
(C-44)Co(II)2,2'-[ethylene-bis(nitrilomethylidyne)] diphenol
(C-45)Ni(II)2,2'-[1,8-naphthylene-bis(nitrilomethylidyne)] diphenol
(C-46)Ni(II)-(N-phenylformimidoyl)phenol
(C-47)Co(II)-(N-phenylformimidoyl)phenol
(C-48)Cu(II)-(N-phenylformimidoyl)phenol
(C-49)Ni(II)salicylaldehydephenylhydrozone
(C-50)Ni(II)salicylaldehydeoxime

(5) thiobisphenolate chelates

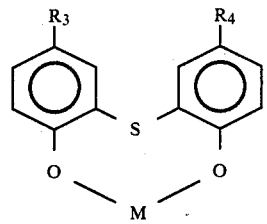

(where, M is the same as defined previously, and $R_3$ and $R_4$ each stands for an alkyl group. M may be charged negatively, and may form salts with cations.)

(C-51)Ni(II)n-butylamino[2,2'-thiobis(4-tert-octyl)-phenolate] [Cyasorb-UV-1084(American Cyanamide Company Ltd.)]
(C-52)Co(II)n-butylamino[2,2'-thiobis(4-tert-octyl)-phenolate]
(C-53)Ni(II)2,2'-thiobis 4-tert-octyl)phenolate

(6) hydrazine-S-methyl ditho carboxylates General formula

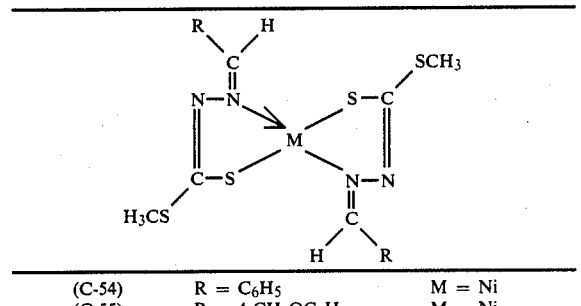

| | | |
|---|---|---|
| (C-54) | R = C$_6$H$_5$ | M = Ni |
| (C-55) | R = 4-CH$_3$OC$_6$H$_4$ | M = Ni |
| (C-56) | R = 4-NO$_2$C$_6$H$_4$ | M = Ni |

-continued

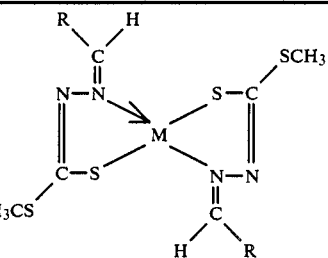

| | | |
|---|---|---|
| (C-57) | R = 2-NO$_2$C$_6$H$_4$ | M = Ni |
| (C-58) | R = C$_6$H$_5$ | M = Co |
| (C-59) | R = 4-CH$_3$OC$_6$H$_4$ | M = Co |
| (C-60) | R = C$_6$H$_5$ | M = Pt |
| (C-61) | R = C$_6$H$_5$ | M = Pd |

(7) General formula

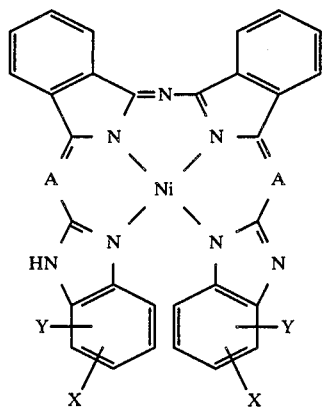

| | A | X | Y |
|---|---|---|---|
| (C-62) | N | H | H |
| (C-63) | N | Cl | H |
| (C-64) | N | CH$_3$ | H |
| (C-55) | N | CH$_3$ | CH$_3$ |
| (C-66) | N | CH$_3$ | Cl |
| (C-67) | C(CN) | H | H |
| (C-68) | C(CN) | H | C$_2$H$_5$ |
| (C-69) | C(CN) | Br | H |

(8) General formula

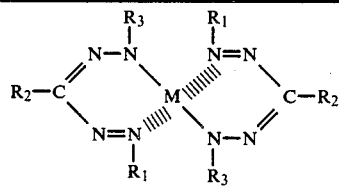

| | M | R$_1$ | R$_2$ | R$_3$ |
|---|---|---|---|---|
| (C-70) | Ni | CH$_3$ | C$_6$H$_5$ | CH$_3$ |
| (C-71) | Ni | CH$_2$Cl | C$_6$H$_5$ | C$_2$H$_5$ |
| (C-72) | Co | C$_6$H$_5$ | CH$_3$ | C$_6$H$_5$ |
| (C-73) | Pt | 4-CH$_3$OC$_6$H$_4$ | C$_6$H$_5$ | 4-CH$_3$OC$_6$H$_4$ |
| (C-74) | Ni | 3-CH$_3$OC$_6$H$_4$ | C$_6$H$_5$ | 3-CH$_3$OC$_6$H$_4$ |
| (C-75) | Cu | C$_6$H$_5$ | CH$_2$=CH— | C$_6$H$_5$ |

Of the above mentioned metal complexes, bisdithio-2-diketones and bisphenyldithiols are especially preferable. The mixing ratio of the transition metal complex to the dye represented by the general formula [I] is about 1/100-½ (by weight), preferably about 1/20-⅓.

The recording layer may further contain a slip agent, a stabilizer, a flame retarder, a surface-active agent, a dispersing agent, a plasticizer and the like in addition to dyes other than those represented by the general formula [I], the binders and the antioxidants. However, it is not preferable to add the binder because it is liable to deteriorate the reflectivity. In contrast, it is preferable to add the antioxidant. The dyes other than those represented by the general formula [I] referred to herein include phthalocyanine dyes, tetrahydrocholine dyes, dioxazine dyes, triphenothiazine dyes, phenanthrene dyes, cyanine dyes other than those represented by the general formula [I], anthraquinone dyes, Xanthene dyes, triphenylmethane dyes, croconium dyes, pyrylium dyes, azulene dyes and the like. The binders include polyvinyl butyral, cellulose acetate, polyvinyl acetate, acrylic resins, polyester, polyamide and the like. As the antioxidants there may be enumerated phenol resins.

Various methods are applicable to the preparation of the recording layer according to the present invention. However, the methods such as vapordeposition, sputtering and the like are not preferable because the compound having the general formula [I] per se is low in sublimation property. It is preferable to apply the coating method where organic solvents are normally used. The application of the coating method is effected by means of usual methods such as spray coating, spin coating, roller coating, dipping and the like, preferably spin coating. As the solvents there may be used usual ones such as alcohols, ketones, amides, ethers, esters, aliphatic halogenated hydrocarbons, aromatic hydrocarbons and the like.

The suitable thickness of the recording layer is 100 Å-1000 Å, preferably 300 Å-700 Å, more preferably 400 Å-600 Å.

Next, the optical information recording medium according to the present invention will be explained with reference to the drawings.

Figure 1:
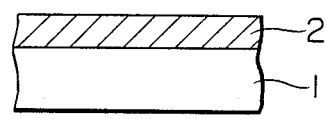
FIG. 1 to FIG. 6 each is a sectional view illustrating the constitutional example of the optical information recording medium according to the present invention.

As shown FIG. 1, the optical information recording medium according to the present invention basically comprises providing, on a substrate 1, a recording layer 2 containing a cyanine dye represented by the above mentioned general formula [I]. This recording layer may be built-up into a double-layered construction by combining the recording layer as a light-absorptive layer with a reflective layer of Ag, Al or the like in optical upper or lower order. However, it is preferable for the present invention to lack the reflective layer.

The recording layer according to the present invention may be provided on one side of both sides of the substrate. Further, it is possible to take the so-called sandwich construction which comprises disposing the recording layer inside between a pair of said recording mediums, and protect the recording layer from scratch, dust and the like. In the sandwich construction, it is possible to provide a protective plate made of the same material as used in the substrate opposite to the recording layer. However, this protective plate must be transparent when the substrate on the recording layer side is opaque.

The substrate 1 must be transparent to the laser beam used when writing record is effected from the substrate side, and has no necessity of being transparent thereto when writing record is effected from the recording layer side. As the substrate, there are normally used glass; plastics such as polyester, polyamide, polyolefin, polycarbonate, epoxy resin, polyimide, acrylic resin (for instance, polyacrylic or polymethacrylic ester), polymethylpentene and the like; metals; and ceramics. Among them, plastics, in particular acrylic resins and polycarbonate, are preferably used because they are light and difficult to break. These substrate surfaces may be provided with a groove for guiding the laser beam at the time of recording or regenerating for instance by the injection method. The guiding groove will be detailed afterwards.

Figure 2:
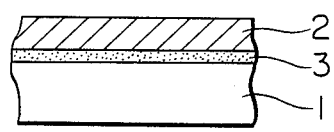
Figure 3:
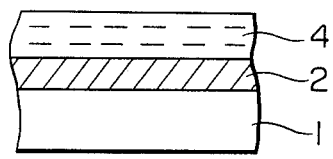
Figure 4:
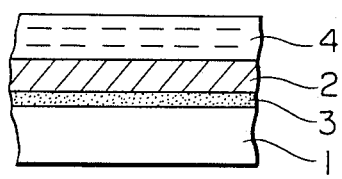

The optical information recording medium according to the present invention is basically comprised of a substrate 1 and a recording layer 2 as shown in FIG. 1, but may be provided further with an undercoat layer 3, a protective layer 4 and the like, if necessary, as shown in FIG. 2 to FIG. 4. Further, the optical information recording medium according to the present invention may take the so-called air sandwich construction which comprises using two identical recording layers 2, on two opposed recording mediums, and disposing said recording layers inside between said opposed recording mediums and sealing up, or may take the so-called adhering sandwich construction (adhered construction) which comprises adhering the said recording mediums through the protective layer 4. In addition, the recording medium constructed so as to have the undercoat layer 3 provided with a guide groove is within the scope of the present invention. This will be detailed afterwards.

The undercoat layer and/or protective layer may contain a stabilizer, a dispersing agent, a flame retarder, a slip agent, an antistatic agent, a surface active agent, a plasticizer and the like.

The undercoat layer 3 is used for the purpose of (a) improving the adhesive property, (b) providing the barrier to water, gas and the like, (c) improving the preservation ability of the recording layer, (d) improving the reflectivity, (e) protecting the substrate from the solvent, and (f) forming a guide groove and the like. In order to achieve the purpose (a), there are used for instance high molecular materials such as ionomer resins, polyamide resins, vinyl resins, natural high polymers, silicones, liquid rubbers and the like; silane coupling agents; and the like. In order to achieve the purposes (b) and (c) there are used the aforesaid high molecular materials and additionally inorganic compounds such, for instance, as $SiO_2$, $MgF_2$, SiO, $TiO_2$, ZnO, TiN, SiN and the like; metals or semi-metals such, for instance, as Zn, Cu, S, Ni, Cr, Ge, Se, Cd, Ag, Al and the like. In order to achieve the purpose (d) there are used metals such, for instance, as Al, Ag and the like, or organic dye thin film having metallic luster such, for instance, as methine dyes, xanthene dyes and the like. In order to achieve the purposes (e) and (f) there are used ultraviolet ray-curing resins, thermo-setting resins, thermoplastic resins and the like. However, it is desirable that the same sort of material be used as that used in the substrate. For instance, in case, especially, an acryl resin plate is used as the substrate, an acrylic photopolymer is used for the undercoat layer. The undercoat layer is mostly used for the purpose (f). This is based on the following reason. Information is recorded in the spiral or concentric circle-like manner, and this pitch must be reduced gradually in order to effect high density record. However, if no guide groove is formed, there will sometimes take place such a disadvantage that recording tracks intersect each other due to shaft deviation or the like. The guide groove is normally constructed so that the raised portion locating at a high level and the recessed portion locating at a low level appear by turns. The height between the raised and recessed portions is normally adjusted to be in the range of $\lambda/12-\lambda/4$ ($\lambda$ stands for the wavelength of laser beam). The width of the recessed portion is about 0.3 $\mu m$–1.2 $\mu m$, and the pitch thereof is about 1.6 $\mu m$–2.4 $\mu m$. On the other hand, as the recording layer according to the present invention is normally formed by organic solvent-coating, it is preferred that the guide groove is insoluble to said solvent and that the material for forming the guide groove has no correlation with the component for constituting the recording layer, in other words the former does not react with the latter for decomposition. In view of this, the guide groove is constituted of preferably acrylic resins such as an acrylic ester copolymer, a methacrylic ester copolymer and the like, in particular photo-curing resins. It is needless to say that this guide groove may be formed on the substrate itself as described above. As the typical examples of the monomers constituting the acrylic resins used in the undercoat layer or substrate on or to which the guide groove is formed, there may be enumerated ethyl acrylate, n-butyl acrylate, i-butyl acrylate, hexyl acrylate, heptyl acrylate, octyl acrylate, 2-ethyl hexyl acrylate, decyl acrylate, dodecyl acrylate, octadecyl acrylate, ethoxy ethyl acrylate, phenoxy ethyl acrylate, 2-hydroxy ethyl acrylate, 2-hydroxy propyl acrylate, 2-hydroxyethylacryloyl phospate, tetrahydrofurfuryl acrylate, stearyl acrylate, lauryl acrylate, N,N-diethylaminoethyl acrylate, N,N-dimethylaminoethyl acrylate, glycidyl acrylate, benzyl acrylate, cyclohexyl acrylate, dicyclopentenyl acrylate and methacrylate corresponding to each of them; diacrylates and dimethacrylates such as 1,3-propanediol diacrylate, 1,3-butanediol diacrylate, 1,6-hexanediol diacrylate, 1,10-decanediol diacrylate, diethyleneglycol diacrylate, triethyleneglycol diacrylate, tetraethylene glycol diacrylate, tripropyleneglycol diacrylate, polyethyleneglycol diacrylate, neopentylglycol diacrylate, hydroxy pivalic acid ester, neopentylglycol diacrylate, trimethylolpropane diacrylate, bis-di(oxyethylenated)bisphenol A diacrylate, bisoxypropylenated bisphenol A diacrylate, bisdi(oxypropylenated) bisphenol A diacrylate, 3-methylpentanediol diacrylate, bis(acryloxymethyl)tricyclodecane, and the methacrylates corresponding to each of the above mentioned acrylates; and triacrylates and trimethacrylates such, for instance, as trimethylolpropane triacrylate, pentaerythritol triacrylate and methacrylates corresponding to each of them and tris(2-hydroxyethyl)isocyanate. As acrylates and methacrylates having 4 or more of functional groups there are enumerated for instance dipentaerythritolhexaacrylate, tetramethylolmethanetetraacrylate and pentaerythritoltetraacrylate and methacrylates corresponding to each of them. Among the above mentioned esters, diacrylic acid esters are preferable in the point of crosslinking property, and the bis(acryloxy)tricyclodecane is especially preferable because it hardly reacts with the recording layer.

In the preparation of the substrate or undercoat layer which is made of the above mentioned acrylic resin and has a guide groove, there may be used the above mentioned esters and additionally the known photopolymerization initiator (for instance, benzoin ethers), a sensitizer (for instance, amines), a storage stabilizer (for instance, tetraammonium chloride) and the like as occasion demands. The photo-polymerization initiator is used in the range of 0.05–10 parts by weight, preferably in the range of 0.2–5 parts by weight, per 100 parts by weight of the monomer of the acrylic acid ester or methacrylic acid ester. The sensitizer is preferably added in the range of 0.01–5 parts by weight per 100 parts by weight of the monomer. The storage stabilizer is preferably added in the range of 0.001–2 parts by weight per 100 parts by weight of the monomer.

In any case, the thickness of the undercoat layer 3 is 0.1–30 $\mu$m, preferably 0.2–10 $\mu$m.

The protective layer 4 is provided for the purpose of protecting the recording layer from scratch, dust and the like and further improving the storage stability and reflectivity of the recording layer. As the material therefor is used the same material as that used for the undercoat layer. The thickness of the protective layer is 0.1–1000 $\mu$m, preferably 50–500 $\mu$m.

Figure 5:
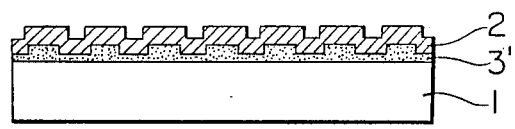

As shown in FIG. 5, one embodiment of the recording medium according to the present invention comprises providing, on a substrate 1, an undercoat layer 3' having a guide groove, and providing a recording layer 2 further thereon. Between the substrate 1 and the undercoat layer 3' (which serves for the aforesaid purpose (f)) may be disposed an anchor coat layer serving for the aforesaid purpose (e).

Figure 6:
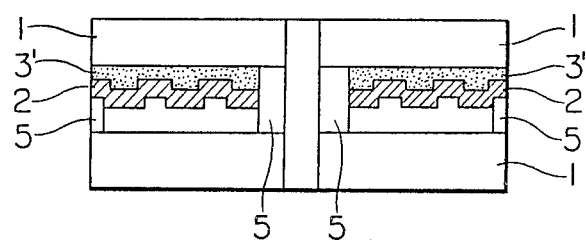

FIG. 6 illustrates the so-called sandwich construction, a preferable construction of the recording medium according to the present invention. This sandwich construction comprises opposing the recording medium constructed as shown in FIG. 5 to a substrate 1 so that the recording layer 2 may be interposed, and integrating same by means of a spacer 5. This opposed substrate 1 may be a mere substrate or a substrate having a recording layer thereon. As another embodiment, there may be employed not the air sandwich construction as shown in FIG. 6 but a single plate construction wherein a protective plate is provided so as to cover the recording layer 2 constructed as shown in FIG. 5.

Next, explanation will be made about a method of forming a guide groove on the substrate or undercoat layer.

The usual injection method and the like are applicable to the formation of the guide groove according to the present invention. In order to form the guide groove capable of accurately writing and reading information on or to the substrate, however, it is preferable to employ a method as explained hereinafter.

Figure 7A:
FIGS. 7a, 7b and 7c are explanatory views illustrating one example of the method of forming a guide groove for a laser beam.
Figure 7B:
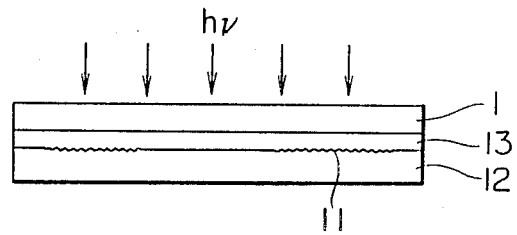
Figure 7C:
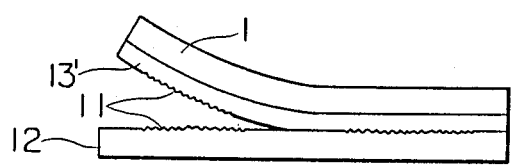

First, a stamper 12 is prepared which has, on its surface, guide grooves (uneven patterns) 11 to be transferred as shown in FIG. 7(a). As the materials for this stamper there are generally used nickel, chromium, or these alloys, and those subjected to surface-hardening treatment as occasion demands. However, it is preferable to use the material transparent to an ultraviolet beam such, for instance, as quartz glass. Next, as can be seen from FIG. 7(b), an acryl type polymerizable composition 13 consisting essentially of the aforesaid acrylic acid or methacrylic acid ester is applied onto the stamper 12, a substrate 1 is superposed thereon, and thereafter same is exposed to radiation of actinic rays h$\nu$ for photo-curing said polymerizable composition 13. The light sources for actinic rays include a low pressure mercury lamp, a high pressure mercury lamp, a super high pressure mercury lamp, a xenon lamp, a metal halide lamp, a carbon arc, an ultraviolet fluorescent lamp and the like. When the stamper 12 is peeled off, as shown in FIG. 7(c), after actinic rays have been radiated, there remains, on the substrate 1, an undercoat layer 13' comprising the acryl type polymer, said layer 13' having the guide grooves (uneven patterns) 11 of the stamper 12 transferred accurately. Every laser beam is usable for the recording and regenerating processes used in the optical information recording medium of the present invention. However, the use of a semi-conductor laser, which wavelength is 750–850 nm, as the laser beam, permits to reduce the size of apparatuses.

The optical information recording medium according to the present invention is advantageous in that it is high in preservability because it is not only high in recording sensitivity but exceedingly stable against heat and light, that written information does not change with the lapse of time and so can be read accurately, and further that said recording medium can be produced readily.

DESCRIPTION OF THE PREFERRED EMBODIMENTS

The present invention will be further explained with reference to examples and comparative examples to be enumerated hereinafter. However, it is to be noted that the present invention should not be limited thereto.

EXAMPLE 1

A polymerizable composition comprising 97 wt % of 1.6-hexanediol acrylate and 3 wt % of benzoinisopropyl ether was dropped onto a quartz stamper; an acryl resin substrate coated with an acrylic resin type coat (Fuji Hard 1878 produced by Fujikura Kasei) was superposed thereon as an anchor coat layer, and thereafter same was exposed at a distance of 26 cm to radiation of a high pressure mercury lamp (80 W/cm) for 2 minutes from the side of a stamper having a guide groove (pitch: 2 $\mu$m, width: 1 $\mu$m and depth: 0.13 $\mu$m) formed thereon and photo-cured. Next, the acrylic resin substrate was separated slowly from the stamper, thereby forming an undercoat layer having a guide groove on the substrate.

Next, a 0.5% dichloroethane solution of the previously enumerated dye No. 1 was spin-coated on this undercoat layer and dried. Then, a 500 Å-thick recording layer was formed.

A signal having 0.7 MHz was recorded on the obtained recording medium by the use of a semiconductor laser beam (wavelength: 790 nm) under the conditions (radiation surface power: 3.2 mW, beam diameter: 1.5 $\mu$m and linear velocity: 1.2 m/sec). This signal was regenerated by radiating a laser beam of 0.2 mW onto this recorded area to find that C/N was 58 dB (IF band width: 30 KHz).

This recording medium was stored in an oven heated to 100° C. for measuring a thermo-fading velocity (a relative velocity when the velocity of the recording medium of Example 1 is 1.0). This recording medium was further left standing under radiation of a tungsten lamp for measuring a photo-fading velocity. (a relative velocity when the velocity of the recording medium of Example 1 is 1.0). The obtained results are shown in the following Table-1.

EXAMPLES 2–8

Each recording medium was prepared according to the exactly same procedure as Example 1 except that the dye employed in Example 1 was replaced by each dye shown in the following table. This recording medium was measured in respect of the photo-fading velocity and the thermo-fading velocity. The obtained values were compared with the relative values. The results are shown in the following Table-1.

EXAMPLE 9

A solution was prepared by further adding 0.05% of bis(4-diethyl-aminobenzyldithio)nickel to a 0.8% ethanol solution of the previously enumerated dye No. 7. This solution was spin-coated on an acrylic plate to form a 450 Å-thick recording layer. Thus, a recording medium was prepared. The results are shown in the following Table-1.

TABLE-1

| Example | Dyes used | Relative thermofading velocity | Relative photo-fading velocity |
|---|---|---|---|
| 1 | Dye No. 1 | 1.0 | 1.0 |
| 2 | Dye No. 6 | 1.1 | 1.0 |
| 3 | Dye No. 5 | 1.0 | 0.9 |
| 4 | Dye No. 3 | 1.0 | 1.1 |
| 5 | Dye No. 11 | 1.2 | 1.3 |
| 6 | Dye No. 9 | 1.2 | 1.1 |
| 7 | Dye No. 8 | 1.0 | 1.0 |
| 8 | Dye No. 4 | 0.9 | 0.7 |
| 9 | Dye No. 7 | 1.1 | 0.6 |

COMPARATIVE EXAMPLES 1–5

Each recording medium was prepared according to the exactly same procedure as Example 1 except that each dye shown in the following Table-2 was employed in place of the dye used in Example 1. This recording medium was measured in respect of the photo-fading velocity and the thermo-fading velocity. The obtained values were compared with the relative values. The results are shown in the following Table-2.

TABLE 2

| Comparative Example | Dye Used | Relative thermo fading velocity | Relative photofading velocity |
|---|---|---|---|
| 1 | [structure] | 1.8 | 1.1 |
| 2 | [structure] | 3.0 | 0.9 |
| 3 | [structure] | 1.5 | 1.4 |
| 4 | [structure] | 16.2 | 0.7 |

TABLE 2-continued

| Comparative Example | Dye Used | Relative thermo fading velocity | Relative photofading velocity |
|---|---|---|---|
| 5 | (indolium trimethine dye with N-CH₃ groups, 2-methylbenzenesulfonate counterion) | 2.2 | 1.4 |

EXAMPLE 10

A 1,2-dichloroethane solution of 0.7 wt % of the previously enumerated dye No. 10 and 0.1 wt % of the previously enumerated complex (C-7) was coated on the undercoat layer having the guide groove formed in Example 1, and dried, thereby forming a 500 Å-thick recording layer. Next, an air sandwich construction as shown in FIG. 6 was formed by opposing this recording layer to an acrylic plate and using a 1 mm-thick spacer and a thermo-setting type epoxy adhesive.

A signal having 0.7 MHz was recorded on the obtained recording medium by the use of a semi-conductor laser beam (wavelength: 790 nm) under the conditions (linear velocity: 1.24 m/sec and beam diameter: 1.6 μm). This signal was regenerated to find that C/N was 54 dB.

Next, this recording medium was left standing for 24 hours under a tungsten light of 500 W. Thereafter, the signal was again regenerated to find that C/N was 53 dB. Apart from this, furthermore, this recording medium was stored for 3000 hours in a thermo-hygrostat of 60° C. and 90% RH. Thereafter, this signal was again regenerated to find that C/N was 51 dB.

EXAMPLE 11–42

Recording mediums were prepared based on the prescriptions shown in the following Table-3 according to the same procedure as Example 10. These recording mediums were evaluated. The obtained results are shown in Table-3 collectively.

COMPARATIVE EXAMPLES 6–9

Recording mediums were prepared based on the prescriptions shown in the following Table-3 according to the same procedure as Example 10. These recording mediums were evaluated. The obtained results are shown in Table-3 collectively. The dyes A-1, A-2 and A-3 are represented by the following formulas in

TABLE 3

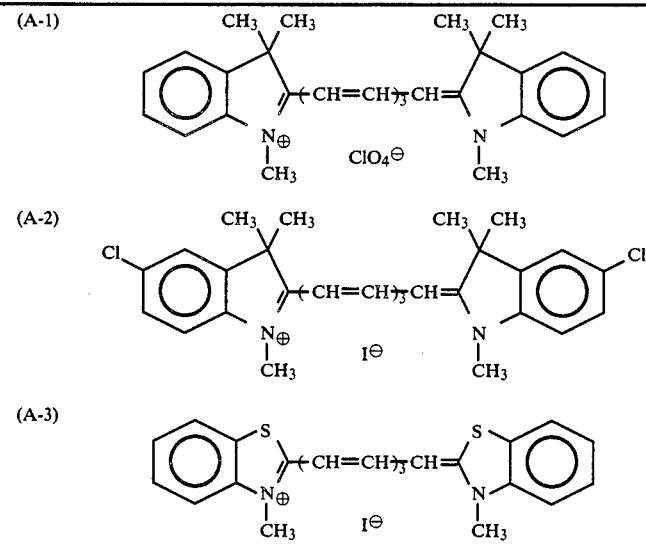

| | Acryl monomer | Dye | Metal complex | Complex/dye | Thickness (Å) of recording layer | C/N (dB) | C/N (dB) after tungsten radiation | C/N (dB) after storage at 60° C., 90% RH |
|---|---|---|---|---|---|---|---|---|
| Example | | | | | | | | |
| 11 | 1,6-hexanediol-diacrylate | Dye No. 2 | C-25 | 0.25 | 380 | 53 | 52 | 50 |
| 12 | 1,6-hexanediol-diacrylate | Dye No. 3 | C-31 | 0.15 | 380 | 55 | 54 | 51 |
| 13 | 1,6-hexanediol-diacrylate | Dye No. 2 | C-40 | 0.15 | 450 | 52 | 50 | 49 |
| 14 | 1,6-hexanediol- | Dye No. 12 | C-37 | 0.20 | 450 | 53 | 52 | 50 |

TABLE 3-continued

| | | | | | | | | |
|---|---|---|---|---|---|---|---|---|
| 15 | diacrylate 1,6-hexanediol-diacrylate | Dye No. 7 | C-38 | 0.15 | 450 | 54 | 53 | 51 |
| 16 | bis(acryloxy-methyl)tricy-clo decane | Dye No. 4 | C-37 | 0.20 | 320 | 54 | 54 | 54 |
| 17 | bis(acryloxy-methyl)tricy-clo decane | Dye No. 4 | C-38 | 0.15 | 320 | 53 | 53 | 53 |
| 18 | bis(acryloxy-methyl)tricy-clo decane | Dye No. 4 | C-31 | 0.10 | 530 | 55 | 54 | 55 |
| 19 | bis(acryloxy-methyl)tricy-clo decane | Dye No. 5 | C-32 | 0.15 | 500 | 53 | 53 | 53 |
| 20 | bis(acryloxy-methyl)tricy-clo decane | Dye No. 8 | C-33 | 0.15 | 500 | 53 | 52 | 53 |
| 21 | bis(acryloxy-methyl)tricy-clo decane | Dye No. 2 | C-34 | 0.25 | 500 | 52 | 51 | 52 |
| 22 | bis(acryloxy-methyl)tricy-clo decane | Dye No. 7 | C-8 | 0.25 | 600 | 52 | 50 | 52 |
| 23 | bis(acryloxy-methyl)tricy-clo decane | Dye No. 11 | C-35 | 0.15 | 600 | 53 | 52 | 53 |
| 24 | bis(acryloxy-methyl)tricy-clo decane | Dye No. 13 | C-37 | 0.15 | 600 | 54 | 53 | 54 |
| 25 | bis(acryloxy-methyl)tricy-clo decane | Dye No. 9 | C-31 | 0.25 | 600 | 53 | 53 | 53 |
| 26 | bis(acryloxy-methyl)tricy-clo decane | Dye No. 6 | C-33 | 0.30 | 700 | 51 | 50 | 51 |
| 27 | bisdioxyethy-lenated bis-phenol A diacrylate | Dye No. 4 | C-5 | 0.15 | 650 | 53 | 52 | 53 |
| 28 | bisdioxyethy-lenated bis-phenol A diacrylate | Dye No. 6 | C-2 | 0.25 | 400 | 53 | 49 | 49 |
| 29 | bisdioxyethy-lenated bis-phenol A diacrylate | Dye No. 3 | C-8 | 0.10 | 450 | 54 | 50 | 52 |
| 30 | bisdioxyethy-lenated bis-phenol A diacrylate | Dye No. 5 | C-31 | 0.10 | 450 | 55 | 54 | 52 |
| 31 | bisdioxyethy-lenated bis-phenol A diacrylate | Dye No. 5 | C-38 | 0.15 | 450 | 53 | 52 | 50 |
| 32 | bisdioxyethy-lenated bis-phenol A diacrylate | Dye No. 10 | C-32 | 0.20 | 500 | 53 | 52 | 50 |
| 33 | bisdioxyethy-lenated bis-phenol A diacrylate | Dye No. 12 | C-51 | 0.20 | 500 | 53 | 49 | 49 |
| 34 | bis(acryloxy-methyl)tricy-clodecane | Dye No. 4 | C-37 | 0.10 | 300 | 54 | 54 | 54 |
| 35 | bis(acryloxy-methyl)tricy-clodecane | Dye No. 8 | C-38 | 0.10 | 450 | 53 | 52 | 53 |
| 36 | bis(acryloxy-methyl)tricy-clodecane | Dye No. 4 | C-31 | 0.15 | 450 | 53 | 53 | 53 |
| 37 | bis(acryloxy-methyl)tricy-clo decane | Dye No. 11 | C-32 | 0.30 | 650 | 53 | 52 | 53 |
| 38 | bis(acryloxy-methyl)tricy-clodecane | Dye No. 12 | C-33 | 0.25 | 650 | 52 | 50 | 52 |
| 39 | bis(acryloxy-methyl)tricy-clodecane | Dye No. 6 | C-7 | 0.20 | 500 | 51 | 50 | 51 |

TABLE 3-continued

| | | | | | | | | |
|---|---|---|---|---|---|---|---|---|
| 40 | bis(acryloxy-methyl)tricy-clodecane | Dye No. 9 | C-8 | 0.20 | 700 | 52 | 52 | 52 |
| 41 | bis(acryloxy-methyl)tricy-clodecane | Dye No. 2 | C-35 | 0.30 | 700 | 51 | 50 | 51 |
| 42 | bis(acryloxy-methyl)tricy-clo decane | Dye No. 1 | C-33 | 0.15 | 600 | 52 | 50 | 52 |
| Comparative Example | | | | | | | | |
| 6 | 1,6-hexanediol diacrylate | A-1 | C-8 | 0.15 | 400 | 53 | 50 | 49 |
| 7 | 1,6-hexanediol diacrylate | A-2 | C-37 | 0.15 | 400 | 52 | 50 | 45 |
| 8 | 1,6-hexanediol diacrylate | A-3 | C-7 | 0.15 | 400 | 50 | 46 | 40 |
| 9 | 1,6-hexanediol diacrylate | A-1 | C-7 | 0.15 | 400 | 53 | 50 | 46 |

We claim:

1. An optical information recording medium capable of recording and regenerating information with a laser beam, comprising: a substrate, a recording layer on said substrate, said recording layer having a thickness of from 100–1000 Angstroms and containing a cyanine dye represented by the general formula:

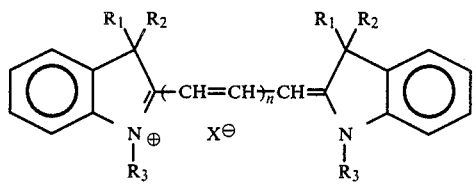

wherein, $R_1$ and $R_2$ may be the same or different and each stands for a substituted or unsubstituted alkyl group; $R_3$ is substituted alkyl, unsubstituted alkyl or benzyl; X stands for perhalogenate ion, a toluenesulfonate ion or an alkylsulfate ion; n stands for an integer of 0 or 1–3; a first halogen atom is present in at least one of the 4, 6 and 7-positions of both of the indole and indolenine rings; a second halogen atom may optionally be present in the 5-position of both of said rings; and at least one substituent group selected from the group consisting of alkyl, alkoxy, hydroxy, carboxy, alkyl and alkylcarbonyl may optionally be present in at least one of the 4, 5, 6 and 7-positions of both of said rings wherein said recording contains no binder.

2. A recording medium according to claim 1, wherein both said second halogen atom and said at least one subitituent group are present in both of said rings.

3. A recording medium according to claim 1, wherein said second halogen atom is present in both of said rings 4. A recording medium according to claim 3, wherein said first halogen atom is present in the 7-position of both of said rings.

5. A recording medium according to claim 1, wherein said recording layer consists of said cyanine dye.

6. A recording medium according to claim 1, wherein the recording layer further contains an antioxidant.

7. A recording medium according to claim 1, wherein the recording layer is 300–700 Å thick.

8. A recording medium according to claim 1, wherein the recording layer is 400–600 Å thick.

9. A recording medium according to claim 1, wherein the recording layer is formed by means of a coating method.

10. A recording medium according to claim 9, wherein said coating method is spin coating.

11. A recording medium according to claim 1, wherein said substrate is transparent to a writing laser beam.

12. A recording medium according to claim 1, wherein the substrate is made of plastic.

13. A recording medium according to claim 12, wherein said plastic is an acryl resin.

14. A recording medium according to claim 1, wherein the substrate itself is provided with a guide groove for a laser beam.

15. A recording medium according to claim 1, wherein an undercoat layer is further provided between the substrate and the recording layer.

16. A recording medium according to claim 15, wherein said undercoat layer is formed of one member selected from the group consisting of an ultraviolet-ray-setting resin, a thermo-setting resin and a thermo-plastic resin.

17. A recording medium according to claim 16, wherein said ultraviolet-ray-setting resin is an acryl resin.

18. A recording medium according to claim 15, wherein said undercoat layer has a guide groove.

19. A recording medium according to claim 15, wherein the undercoat layer is 0.1–30 μm thick.

20. A recording medium according to claim 19, wherein the undercoat layer is 0.2–10 μm thick.

21. A recording medium according to claim 1, wherein a protective layer is further provided on the recording layer.

22. A recording medium according to claim 21, wherein said protective layer is 0.1–1000 μm thick.

23. A recording medium according to claim 22, wherein the protective layer is 50–500 μm thick.

24. An optical information recording medium according to claim 1, in which said recording layer contains a transition metal complex or a salt of said complex with a cation.

25. A recording medium according to claim 24, wherein both second halogen atom and at least one substituent group are present in both of said rings.

26. A recording medium according to claim 24, wherein said second halogen atom is present in both of said rings.

27. A recording medium according to claim 26, wherein said first halogen atom is present in the 7-position of both of said rings.

28. A recording medium according to claim 24, wherein said recording layer consists of said cyanine dye and said transition metal complex or a salt of said complex with a cation.

29. A recording medium according to claim 24, wherein the mixing ratio of said complex to said cyanine dye is about 1/100-½ by weight.

30. A recording medium according to claim 29, wherein the mixing ratio of said complex to said cyanine dye is about 1/20-⅓ by weight.

31. A recording medium according to claim 24, wherein said complex is selected from the group consisting of bisdithio-2-diketones and bisphenyl-dithiols.

32. A recording medium according to claim 24, wherein the recording layer is 300–700 Å thick.

33. A recording medium according to claim 24, wherein the recording layer is 400–600 Å thick.

34. A recording medium according to claim 24, wherein the recording layer is formed by a coating method.

35. A recording medium according to claim 34, wherein said coating method is spin coating.

36. A recording medium according to claim 24, wherein the substrate is transparent to a writing laser beam.

37. A recording medium according to claim 24, wherein the substrate is made of plastic.

38. A recording medium according to claim 37, wherein said plastic is an acryl resin.

39. A recording medium according to claim 24, wherein the substrate itself is provided with a guide groove for a laser beam.

40. A recording medium according to claim 24, wherein an undercoat layer is further provided between the substrate and the recording layer.

41. A recording medium according to claim 40, wherein said undercoat layer is formed of one member selected from the group consisting of an ultraviolet-ray-setting resin, a thermo-setting resin and a thermo-plastic resin.

42. A recording medium according to claim 41, wherein said ultraviolet-setting resin is an acryl resin.

43. A recording medium according to claim 40, wherein the undercoat layer has a guide groove.

44. A recording medium according to claim 40, wherein the undercoat layer is 0.1–30 μm thick.

45. A recording medium according to claim 44, wherein the undercoat layer is 0.2–10 μm thick.

46. A recording medium according to claim 24, wherein a protective layer is further provided on the recording layer.

47. A recording medium according to claim 46, wherein said protective layer is 0.1–1000 μm thick.

48. A recording medium according to claim 41, wherein the protective layer is 50–500 μm thick.

49. A recording medium according to claim 1 wherein each of said alkyl and alkoxy have from 1 to 4 carbon atoms.

50. A recording medium according to claim 49 wherein said substituted alkyl is selected from the group consisting of hydroxyalkyl, aminoalkyl, halogenoalkyl, allylalkyl, alkoxyalkyl and acyloxyalkyl.

51. A recording medium according to claim 49 in which $X^-$ is $ClO_4^\ominus$, $CH_3$

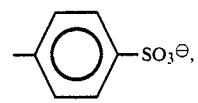

$C_2H_5SO_4^\ominus$ or $CH_3SO_4^\ominus$.

52. A recording medium according to claim 49 in which said cyanine dye has the formula

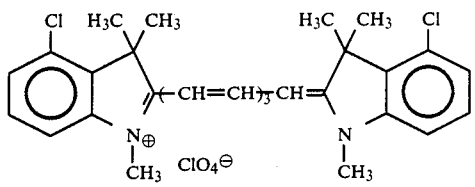

53. A recording medium according to claim 49 in which said cyanine dye has the formula

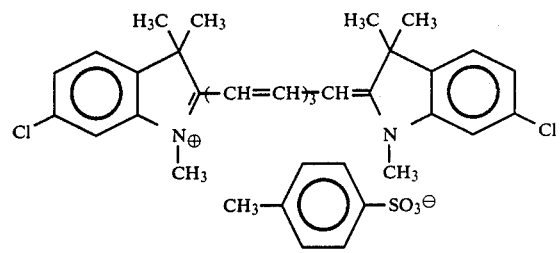

54. A recording medium according to claim 49 in which said cyanine dye has the formula

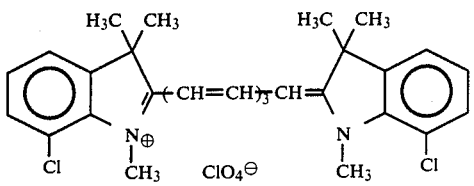

55. A recording medium according to claim 49 in which said cyanine dye has the formula

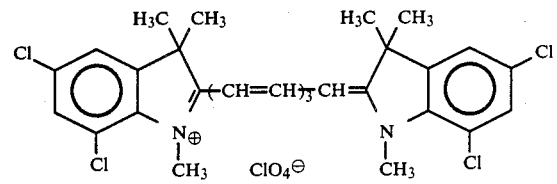

56. A recording medium according to claim 49 in which said cyanine dye has the formula

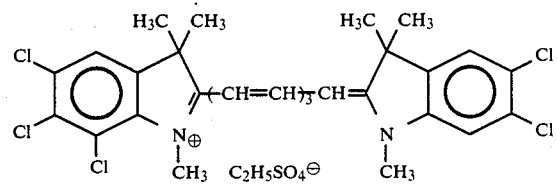

57. A recording medium according to claim 49 in which said cyanine dye has the formula

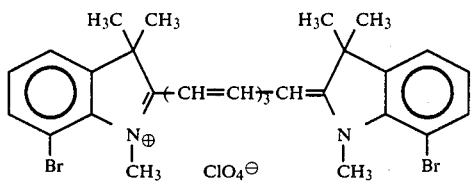

58. A recording medium according to claim 49 in which said cyanine dye has the formula

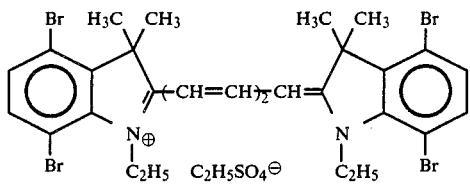

59. A recording medium according to claim 49 in which said cyanine dye has the formula

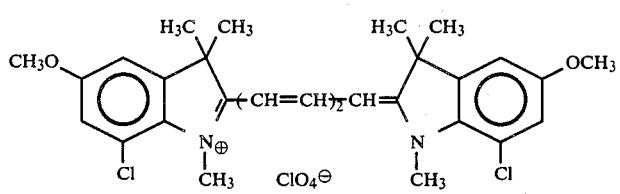

60. A recording medium according to claim 49 in which said cyanine dye has the formula

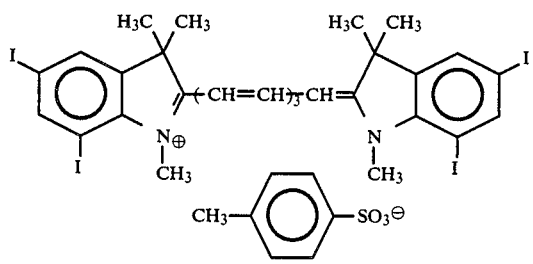

61. A recording medium according to claim 49 in which said cyanine dye has the formula

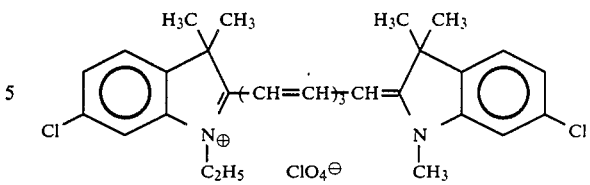

62. A recording medium according to claim 49 in which said cyanine dye has the formula

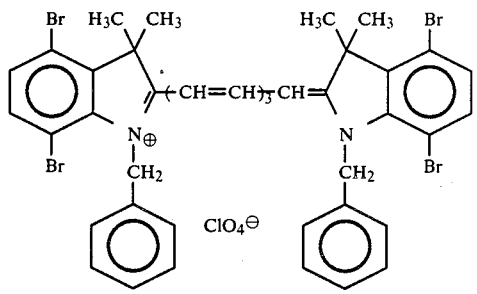

63. A recording medium according to claim 49 in which said cyanine dye has the formula

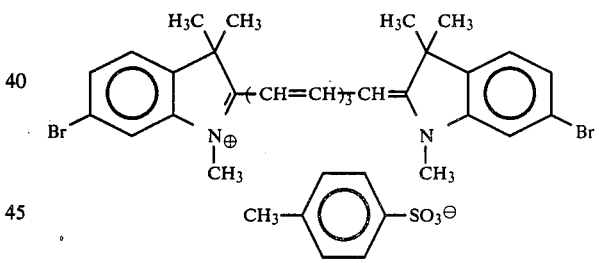

64. A recording medium according to claim 49 in which said cyanine dye has the formula

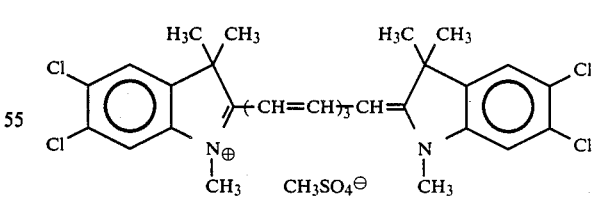

* * * * *

UNITED STATES PATENT AND TRADEMARK OFFICE
CERTIFICATE OF CORRECTION

PATENT NO. : 4 767 693
DATED : August 30, 1988
INVENTOR(S) : Hideaki OBA et al

It is certified that error appears in the above-identified patent and that said Letters Patent is hereby corrected as shown below:

Column 19, line 49; after "recording" insert ---layer---.
line 54; after "rings" insert a period.
Column 21, line 68; change "CH3" to ---$CH_3$---.
Column 22, lines 60-65; change the lefthand portion of the formula to read as follows:

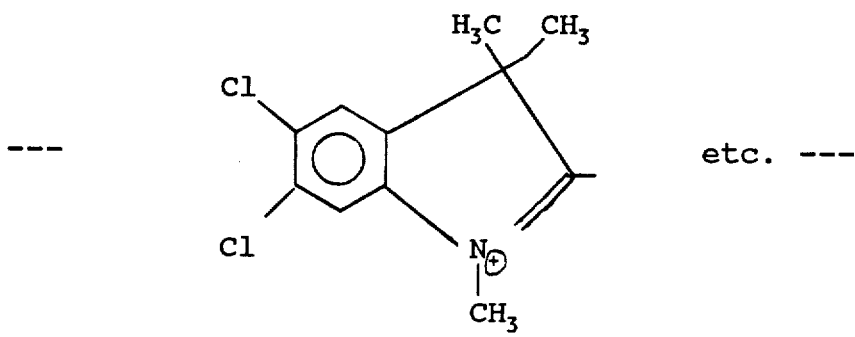

Signed and Sealed this

Fourth Day of July, 1989

Attest:

DONALD J. QUIGG

Attesting Officer

Commissioner of Patents and Trademarks